Nov. 18, 1924.
R. E. LUNDAY
1,515,958
DIRECTION INDICATOR FOR MOTOR VEHICLES
Filed June 14, 1920　　2 Sheets-Sheet 1
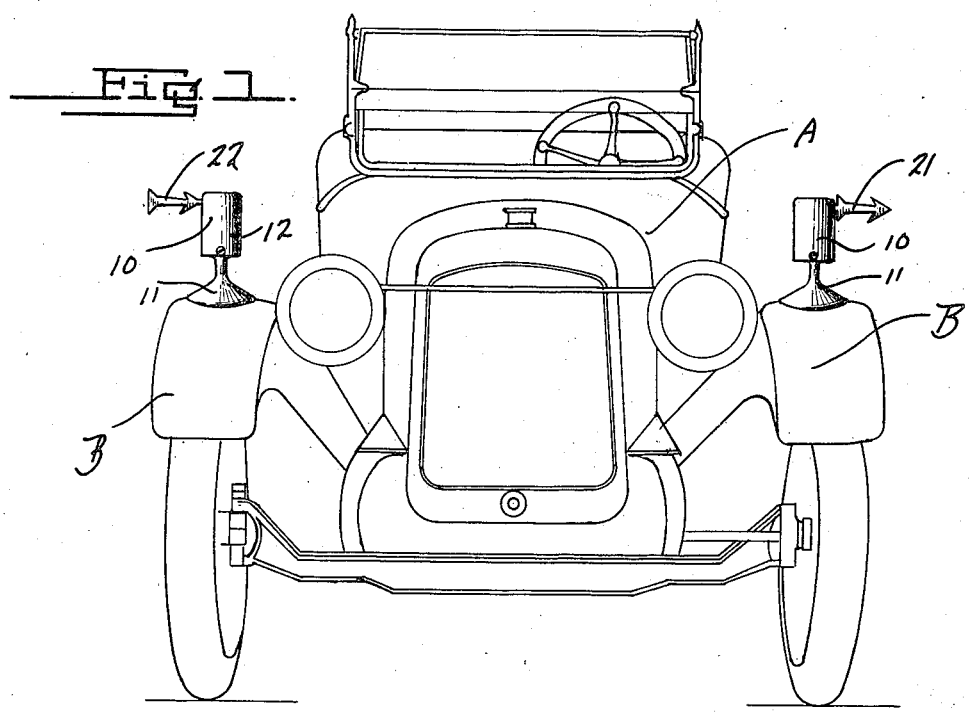
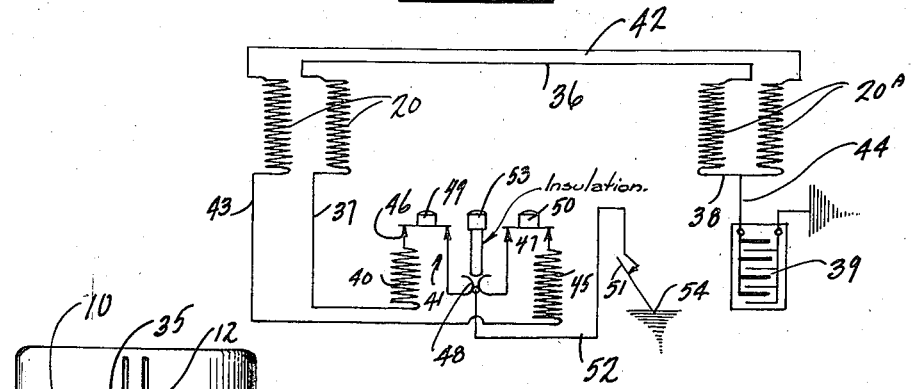
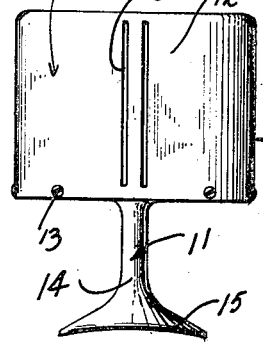
Russell E. Lunday.
Inventor
By Lamaster and Allwine
Attorneys

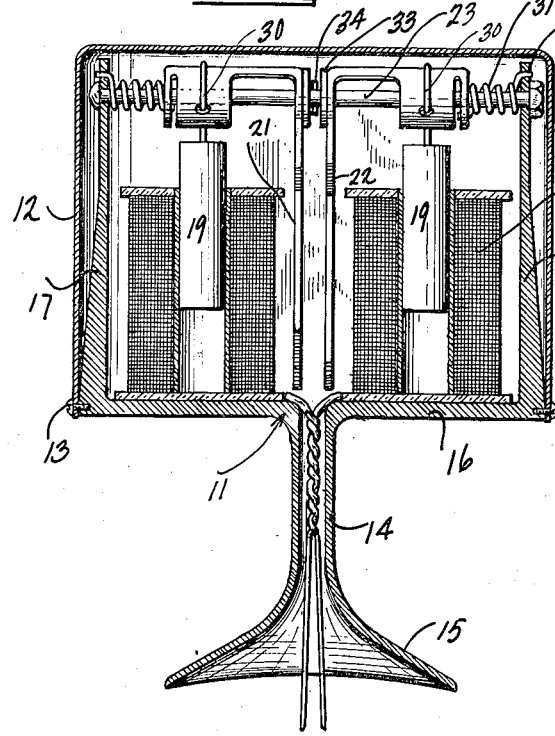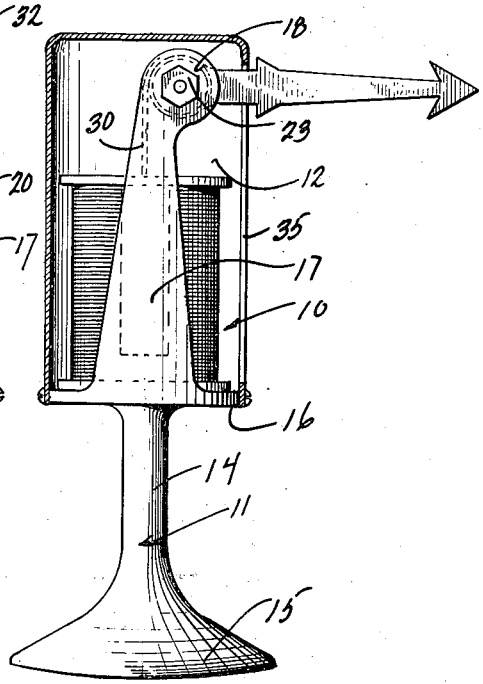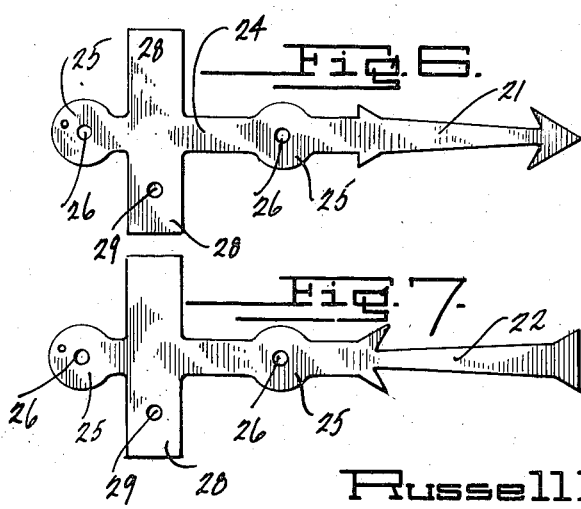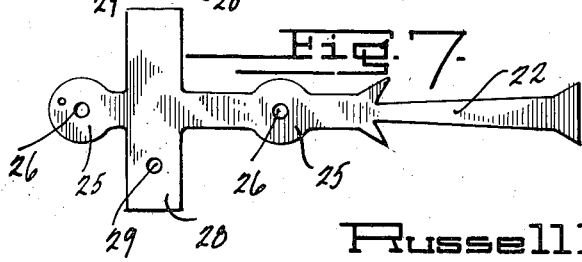

Patented Nov. 18, 1924.

1,515,958

UNITED STATES PATENT OFFICE.

RUSSELL E. LUNDAY, OF BUTTE, MONTANA.

DIRECTION INDICATOR FOR MOTOR VEHICLES.

Application filed June 14, 1920. Serial No. 388,895.

*To all whom it may concern:*

Be it known that I, RUSSELL E. LUNDAY, a citizen of the United States, residing at Butte, in the county of Silver Bow and State of Montana, have invented certain new and useful Improvements in Direction Indicators for Motor Vehicles, of which the following is a specification.

This invention relates to direction indicators for motor vehicles and is a continuation in part of my pending application filed August 18, 1919, Serial No. 318,266.

One of the primary objects of the present invention is to provide an improved signal for motor vehicles, by means of which the driver of a motor vehicle can indicate the direction he is about to take without removing his hands from the steering wheel and thereby eliminate the dangers associated with such practice.

Another prime object of the invention is to provide an improved direction indicator, which will present a pleasing appearance and which can be associated with any vehicle of any approved type and which can be readily actuated with a minimum amount of effort and time on the part of the operator.

A further object of the invention is the provision of an improved direction indicator for motor vehicles embodying housings carried by the fenders of the motor vehicle and indicating pointers or arrows carried by and normally positioned in said housings, means being provided for operating said indicating pointers or arrows to permit the same to extend out of said housings to an operative indicating position when desired by the operator of the vehicle.

A still further object of the invention is to provide an improved direction indicator for vehicles of the above character which is durable and efficient in use, one that is simple and easy to manufacture, one which can be placed upon the market at a reasonable cost, and one which can be neatly and easily installed in existing machines or embodied therein at the time of manufacture.

With these and other objects in view, the invention consists in the novel construction, arrangement and formation of parts as will be hereinafter more specifically described, claimed and illustrated in the accompanying drawings, forming a part of this specification, in which drawings:

Figure 1 is a front elevation of a motor vehicle showing the improved direction indicator applied thereto and showing one pair of the indicating arrows in their operative indicating position.

Figure 2 is a diagrammatic view of the circuit employed in the improved direction indicator.

Figure 3 is a side elevation of one of the housings of the direction indicator which is adapted to be attached to one of the forward vehicle fenders.

Figure 4 is an enlarged vertical section through the same.

Figure 5 is an enlarged vertical section through one of the housings taken at right angles to Figure 4.

Figures 6 and 7 are plan views of the blanks of a pair of the indicating arrows or pointers which are adapted to be positioned in each one of the housings.

Referring to the drawings in detail, wherein similar reference characters designate corresponding parts throughout the several views, the letter A indicates a motor vehicle of any approved type having the usual fenders or mud guards B, and in Figure 1 of the drawings is shown the housings 10 of the direction indicator mounted upon said mud guards adjacent their front ends so as to be readily visible. While the housings 10 have been shown mounted on the front mud guards B it is to be understood however, that the housings may be mounted on the rear mud guards or any other desired or convenient point upon the motor vehicle A where the same will be readily seen, without departing from the spirit or scope of this invention.

Each of the housing 10 include a base casting 11, and a sheet metal cover 12 which is detachably connected to the casting 11 by means of removable fastening elements 13. The base casting 11 includes the hollow standard 14 through which the electric conducting wires are adapted to extend, the flared supporting base 15 and the supporting plate 16. The opposite ends of the plate 16 have cast thereon the upwardly extending arms 17 which have their upper terminals slightly offset, as at 18, so as to center the cores 19 which are slidably mounted in the solenoids 20. As clearly shown in Figure 4 of the drawings there are two solenoids arranged in each housing, and the solenoids are adapted to operate respectively the indicating arrows or pointers 21 and 22, which will be hereinafter more specifically described. The upper offset terminals 18 of the arms 17 are drilled to provide openings for the transversely extending supporting shaft or pin 23, which has rotatably mounted thereon the indicating pointers or arrows 21 and 22.

The arrows 21 and 22 mounted in each of the housings 10 are arranged so as to point in opposite directions, as clearly shown in Figures 6 and 7 of the drawings, and it is to be understood that when the direction indicator is operated, simultaneously one arrow in each casing is raised, both of which arrows point in the same direction, as shown in Figure 1 of the drawings. These arrows are preferably formed from a single sheet of metal and the indicating portions thereof can be treated with a suitable illuminating paint or the like so that the same can be readily seen at night as well as in the day time. As shown the blanks of the arrows include a flat shank 24 which is provided at spaced points with disc shaped portions 25 which are adapted to be bent at right angles to the shank, and the same are provided with openings 26 for the reception of the shaft or supporting pin 23. The shank intermediate the discs 25 is provided with outwardly extending ears 28 which are adapted to be bent to form a cylindrical barrel which is adapted to extend around the shaft. One of the ears is provided with an opening 29 which is adapted to receive one end of a wire cable or cord 30 which is trained around the cylindrical barrel formed by the ears 28. The opposite ends of these wire cables or cords are connected to the sliding cores 19. The shaft or pin 23 has also coiled around the same the tension springs 31 each of which have one of their terminals secured, as at 32, to the upper end of the arms 17 and their other terminals to the outer discs 25 of the indicating pointers or arrows. These springs serve a two fold function, namely for normally holding the indicators or arrows in their inoperative positions in the housings, and for holding the same in frictional contact with the stop washers 33, which are held in spaced position by means of a cross or cotter pin 34. The cover 12 of each of the housings is provided with a pair of vertically disposed slots 35 through which the arrows 21 and 22 are adapted to extend when the same are operated.

An improved selective switch mechanism is provided for operating the indicating pointers or arrows 21 and 22, which has been disclosed and described in detail in my parent application heretobefore mentioned. In Figure 2 is shown the diagrammatic wiring arrangement of the indicators in which the selective switch mechanism is indicated diagrammatically.

In Figure 2 of the drawings the numbers 20 and 20ª indicate the solenoids which are arranged in the opposite housings 10 and the windings of the inner solenoids are connected together by an electric wire 36. The opposite terminals of these solenoids are connected respectively by means of wires 37 and 38 with one terminal of the electric battery 39 and with one terminal of the windings of an electromagnet 40 which forms a part of the selective switch mechanism designated by the numeral 41. The outer solenoids are connected by an electric wire 42, and the opposite terminals of these windings are connected respectively by wires 43 and 44 with one terminal of the storage battery 39 and with one terminal of the windings of another electromagnet 45 which also forms a part of the selective switch mechanism 41. Pairs of spaced contacts 46 and 47 are provided and one contact of each pair is connected to the outer windings of the electromagnets 40 and 45, while the other contact of the pairs are adapted to be connected by spring members 48. The pairs of contacts 46 and 47 are adapted to be bridged by buttons 49 and 50 which are normally held in raised position by suitable spring means. Briefly, when these magnets are energized the buttons are held in their circuit closing position and are held in that position until the circuit is broken by an automatic circuit breaking means indicated by the numeral 51, which is connected to the spring contacts 48 by means of a wire 52. The spring contacts are also adapted to be spread by an insulating rod 53 which is adapted to be forced between the contacts 48 to spread the same. One terminal of the automatic circuit breaking means is grounded, as at 54, as is the other terminal of the battery 39.

Thus, when the vehicle is equipped with the improved signalling device is going to turn, one of the buttons 49 or 50 is depressed which will close the circuit through one of the electromagnets 40 or 45 and through one solenoid in each of the housings 10. This will attract the cores of the solenoids and draw down on the wire cables or cords 30 and rotate the discs 25 on the shafts or pins 23, which will raise either of the arrows 21 and 22 in each of the housings 10.

The raised arrows will both point in the direction in which the vehicle is going to turn and thus indicate to vehicles in the rear thereof which direction the vehicle is going to take.

From the foregoing description, it can be seen that an improved vehicle signal has been provided which is of exceptionally simple and durable construction, which can be easily applied to any car and which will add to the appearance of the car rather than detract therefrom.

Changes in details may be made without departing from the spirit or scope of this invention; but,

I claim:

1. In a signal for motor vehicles, a base plate, a pair of upstanding arms carried by the opposite ends of the base plate, a pair of solenoids secured to the base plate, a cover arranged to house said solenoids and arms, a transversely extending shaft carried by the upper terminals of the arms, cores for said solenoids, cylindrical barrels rotatably mounted upon said shaft, thrust washers carried by the central portion of said shaft, means for limiting the inward movement of said washers, said barrels being arranged to engage said thrust washers, indicating pointers carried by said barrels, and spring means coiled around said shaft adjacent to the terminals thereof and engaging said arms and the outer ends of said barrels for normally holding said barrels in engagement with the thrust washers and the arms in their lower non-exhibiting position.

2. A direction indicator comprising a support, a solenoid carried by the support including a sliding core, a rod carried by the support transversely of and above the sliding core of said solenoid, a sheet metal indicator arm including a rolled barrel portion, the indicator arm and rolled barrel portion being rigid and rotatably mounted upon said rod, a spiral spring connected at one end to said support and at its other end to said barrel whereby to normally urge the barrel and indicator arm so that the latter is in non-indicating position, and a cable connected with said solenoid core and wound about said barrel.

RUSSELL E. LUNDAY.